United States Patent [19]

Kikuchi et al.

[11] Patent Number: 5,584,022

[45] Date of Patent: Dec. 10, 1996

[54] ENCIPHERED FILE SHARING METHOD

[75] Inventors: Hiroaki Kikuchi; Ryota Akiyama; Naoya Torii; Takayuki Hasebe, all of Kawasaki, Japan

[73] Assignee: Fujitsu Limited, Kawasaki, Japan

[21] Appl. No.: 160,883

[22] Filed: Dec. 3, 1993

[30] Foreign Application Priority Data

Dec. 3, 1992 [JP] Japan .................................. 4-323950

[51] Int. Cl.$^6$ .............................. G06F 15/00; G06F 9/00; G06F 9/04
[52] U.S. Cl. .............................. 395/609; 380/21; 380/45; 380/29; 380/49; 380/30
[58] Field of Search .......................... 395/600; 178/22.1; 375/2; 380/21

[56] References Cited

U.S. PATENT DOCUMENTS

| | | | |
|---|---|---|---|
| 4,203,166 | 5/1980 | Ehrsam et al. ................................ | 375/2 |
| 4,405,829 | 9/1983 | Rivest et al. ............................ | 178/22.1 |
| 4,910,773 | 3/1990 | Hazard et al. ............................. | 380/21 |
| 5,251,258 | 10/1993 | Tanaka ...................................... | 380/21 |

OTHER PUBLICATIONS

1990 International Symposium on Information Theory and Its Applications "ID–Based Key Management System Using Discrete Exponentiation Calculation" by Akiyama et al., Nov. 1990.

*Primary Examiner*—Thomas G. Black
*Assistant Examiner*—Cheryl R. Lewis
*Attorney, Agent, or Firm*—Staas & Halsey

[57] ABSTRACT

An enciphered file sharing method is adapted to an area distributed type data processing system in which a plurality of data processing units are coupled via a network and a plurality of users share files while maintaining privacy among the users. The enciphered file sharing method includes the steps of (a) enciphering files using a cipher key and storing enciphered files in directories having a hierarchical tree structure in at least a first data processing unit which functions as a file server, (b) enciphering files having the same access attribute by the same cipher key by assigning one cipher key to each of the directories, and (c) transferring the enciphered files in the network and locally deciphering the enciphered files in at least a second data processing unit which is used by one of the users, where the second data processing unit is different from the first data processing unit.

12 Claims, 7 Drawing Sheets

ENCIPHERED FILE SHARING METHOD

BACKGROUND OF THE INVENTION

1. Field of the Invention

The present invention generally relates to enciphered file sharing methods, and more particularly, to an enciphered file sharing method for enabling safe file sharing and maintaining privacy by forming files so that the files are only accessible by authorized persons in a network environment in which a plurality of computers are coupled.

2. Description of the Related Art

In data processing systems, distributed processing environments have progressed recently. Hence, distributed file systems have become more popular. According to the distributed file system, one information is shared by a plurality of users who are coupled via a network.

However, computer units such as work stations which are coupled to the network are not all manufactured by a specific company. In other words, computer units manufactured by various companies are coupled to the network, and the network must be open with respect to such computer units. As a result, tapping, tampering and the like using various monitoring units cannot be prevented.

Because secret documents used in businesses or the like are also treated in the distributed environment, there are strong demands to provide security so that the files are only accessible by authorized persons.

Conventionally, an access control of a file sharing system was carried out based on an access control table which is built into the system. The access control table contains accessible users for each file. For example, the control table indicates that a file F is accessible by users A and B. Hence, every time an access request is made by a person, a check is made to determine whether or not this person is an authorized user of the file by referring to the access control table.

In the conventional single closed system in which a reliable manager exists, it was sufficient to make the management based on the access control table described above. However, due to the recent progress in the distributed processing environment, the scale of the file system has become large, the area of the network has become large, and the network has become more open as mutual connections of computer units manufactured by different companies increased. Therefore, it has become impossible to manage the access by a closed system. In other words, because the files are shared, data are transmitted via the network and tapping by various network monitoring units or the like has become more easy.

On the other hand, in out-sourcing or the like which cannot rely solely on the manager, it must be possible to protect the security of the users even with respect to a wrong doing by the manager.

In order to cope with the above described situation, it is conceivable to encipher the files using enciphering techniques, so that the file sharing system can provide the necessary protection against attacks such as wrong doing by the manager and tapping of the network.

But if each of the individual files were enciphered using mutually different cipher keys, the number of cipher keys would increase depending on the number of files. In addition, there is a possibility that the user himself may not be able to grasp the correspondence of all of the accessible files and the cipher keys. For this reason, it is necessary to realize an efficient key management which reduces the information managed on the user side while maintaining the security.

SUMMARY OF THE INVENTION

Accordingly, it is a general object of the present invention to provide a novel and useful enciphered file sharing method in which the problems described above are eliminated.

Another and more specific object of the present invention is to provide an enciphered file sharing method adapted to an area distributed type data processing system in which a plurality of data processing units are coupled via a network and a plurality of users share files while maintaining privacy among the users. The method includes the steps of enciphering files using a cipher key and storing enciphered files in directories having a hierarchical tree structure in at least a first data processing unit which functions as a file server, enciphering files having the same access attribute by the same cipher key by assigning one cipher key to each of the directories, and transferring the enciphered files in the network and locally deciphering the enciphered files in at least a second data processing unit which is used by one of the users, where the second data processing unit is different from the first data processing unit.

According to the enciphered file sharing method of the present invention, it is possible to efficiently manage cipher keys using a small amount of information by giving a hierarchical authority to each user, even if a large number of files are enciphered using different cipher keys. In addition, it is easy for the user to recognize the range of the directories accessible by the user, because the authority to make the access is given hierarchically. In addition, since the directory itself includes the identification information, even the user having the authority to make access to a large number of directories need only manage a single secret information by himself. Moreover, there is no limit to the number of users who can share a single file. Furthermore, because the files are stored and transferred in the enciphered form, the safety of the shared files can be ensured even if the network is tapped, for example. In addition, it is possible to automatically generate the cipher key by a process of specifying the directory by a specifying means such as a mouse, and it is also possible to automatically decipher the enciphered file by a process of specifying the file by a specifying means such as a mouse. Moreover, by use of the user interface, the user can make access to the files without being conscious of the enciphered state of the files. Furthermore, it is possible to reduce the calculation time by using intermediate results of past calculations when calculating the cipher key.

Still another object of the present invention is to provide the enciphered file sharing method of the type described above, which further comprises the step of automatically calculating a cipher key of a specific directory by specifying the specific directory in a file access support interface.

A further object of the present invention is to provide the enciphered file sharing method of the type described above, which further comprises the step of automatically deciphering a specific file of a specific directory by specifying the specific file in a file access support interface.

Other objects and further features of the present invention will be apparent from the following detailed description when read in conjunction with the accompanying drawings.

DESCRIPTION OF THE PREFERRED EMBODIMENTS

Figure 1:
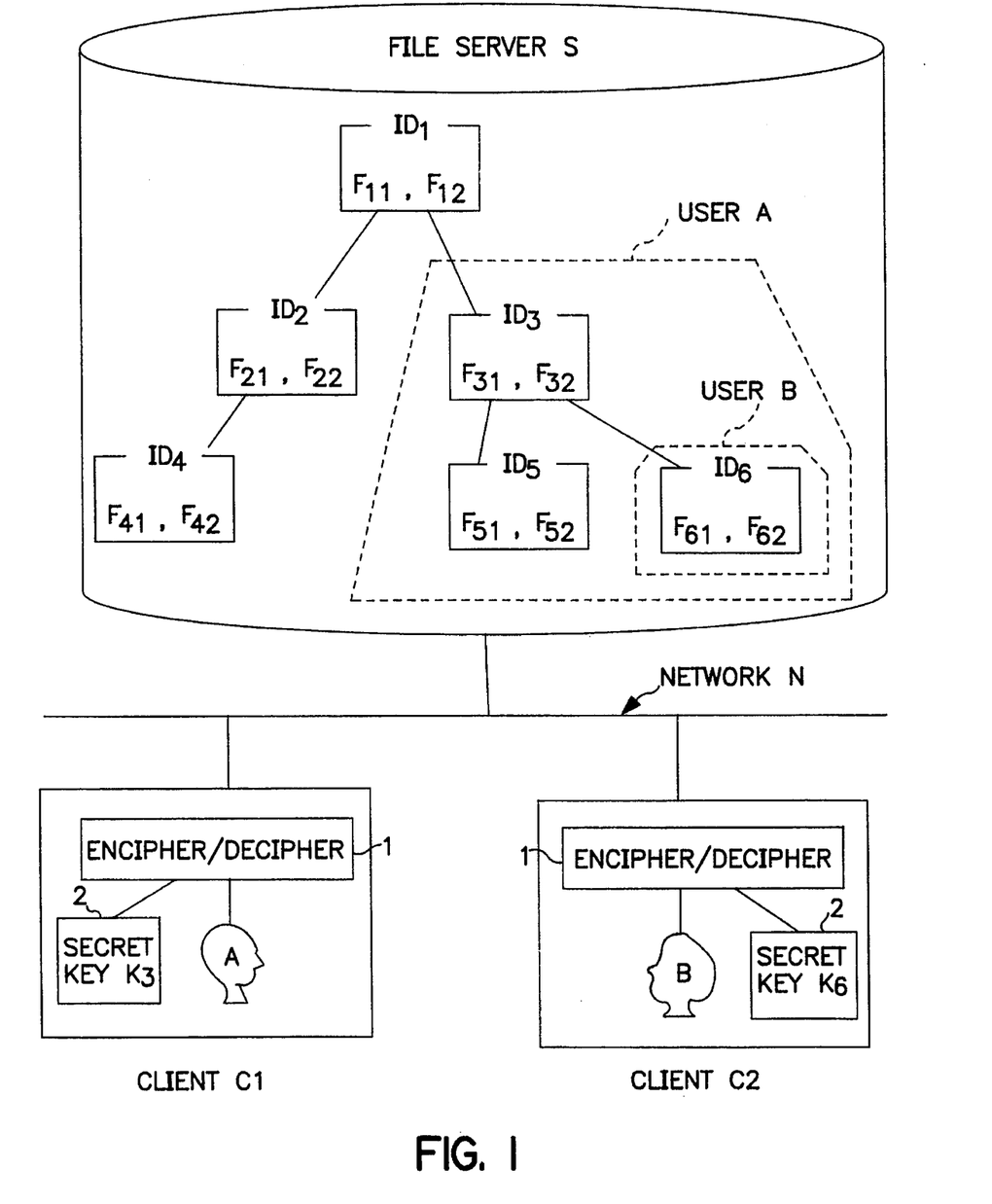
FIG. 1 is a system block diagram for explaining the operating principle of the present invention.

First, a description will be given of the operating principle of the present invention, by referring to FIG. 1. In FIG. 1, a plurality of file clients C1, C2, . . . , and a file server S are coupled to a network N. For example, the file clients C1, C2, . . . and the file server S are data processing units which are coupled to the network N.

The file client C1 is provided with an encipher/decipher (encoding/decoding) unit 1, and a secret key input unit 2. For example, a secret key K3 of a user A is input from the secret key input unit 2 when the user A uses the system.

Similarly, the file client C2 is provided with an encipher/decipher unit 1, and a secret key input unit 2. For example, a secret key K6 of a user B is input from the secret key input unit 2 when the user B uses the system.

The file server S stores files which are shared by a plurality of users. Each file is stored in one of directories forming a hierarchical tree structure. In addition, a cipher key is assigned to each directory.

For example, the file server S stores files F11 and F12 in a directory ID1, files F21 and F22 in a directory ID2, files F31 and F32 in a directory ID3, files F41 and F42 in a directory ID4, files F51 and F52 in a directory ID5, and files F61 and F62 in a directory ID6, as shown in FIG. 1. The directories ID1 through ID6 form the hierarchical tree structure having the directory ID1 at the highest layer as shown in FIG. 1.

The same cipher key is assigned to one directory. Hence, an cipher key K1 is assigned to the directory ID1, and the files F11 and F12 are both enciphered by the cipher key K1. Similarly, cipher keys K2, K3, K4, K5 and K6 are respectively assigned to the directories ID2, ID3, ID4, ID5 and ID6.

The directory IDn stores the cipher keys of all directories in the immediately lower layer by enciphering the cipher keys by the cipher key of the directory IDn. For example, in FIG. 1, the directory ID1 in the highest layer stores the cipher keys K2 and K3 of the directories ID2 and ID3 in the immediately lower layer by enciphering these cipher keys K2 and K3 by the cipher key K1 of the directory ID1. Similarly, the directory ID2 stores the cipher key K4 of the directory ID4 in the immediately lower layer by enciphering the cipher key K4 by the cipher key K2 of the directory ID2. In addition, the directory ID3 stores the cipher keys K5 and K6 of the directories ID5 and ID6 in the immediately lower layer by enciphering these cipher keys K5 and K6 by the cipher key K3 of the directory ID3.

In the particular case shown in FIG. 1, the user A holds the secret key K3. Hence this user A can make access to the directory ID3 and the directories in the lower layers, that is, the directories ID3, ID5 and ID6. On the other hand, the user B holds the secret key K6. Thus, this user B can only make access to the directory ID6.

The shared files F11 through F62 which are stored in the file server S are respectively enciphered when stored by the respective clients. For this reason, even if the network N is tapped or the manager of the file server S is unreliable and out-sourcing may occur, it is possible to prevent the original document or the like from being stolen from the enciphered files.

In addition, the hierarchical structure which describes the authority to make access to the files matches the hierarchical structure of the directories in which the files are actually stored, and the cipher keys of all directories in a layer immediately under an arbitrary directory are enciphered by the cipher key of this arbitrary directory and stored in this arbitrary directory. Therefore, by holding the cipher key of one directory of the hierarchical structure, it is possible to make access to all directories in the layers under this one directory, thereby making it possible to reduce the key information that must be kept by the user.

Figure 2:
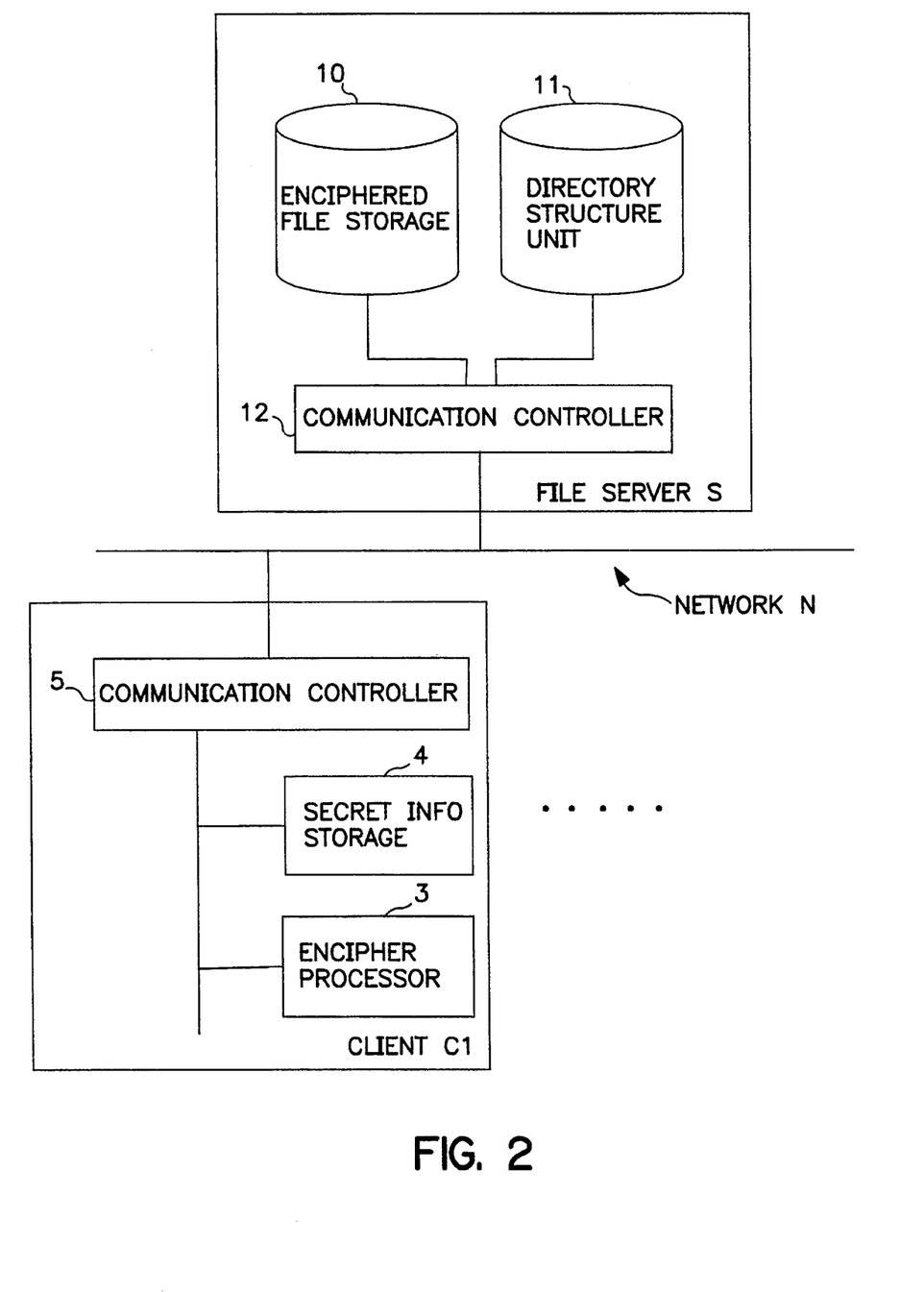
FIG. 2 is a system block diagram for explaining an embodiment of an enciphered file sharing method according to the present invention.

Next, a description will be given of a first embodiment of an enciphered file sharing method according to the present invention, by referring to FIGS. 2 and 3. FIG. 2 shows an essential part of a file sharing system to which this embodiment is applied, and FIGS. 3A and 3B are diagrams for explaining the hierarchical states of the directories and cipher keys in this embodiment.

The file sharing system shown in FIG. 2 includes a network N, a file server S, and a client C1 which are the same as the corresponding elements in FIG. 1. The client C1 has an encipher processor 3, a secret information storage 4, and a communication controller 5. On the other hand, the file server S has an enciphered file storage 10, a directory structure unit 11, and a communication controller 12.

The encipher processor 3 of the client C1 carries out processes such as an enciphering operation for enciphering the original document or the like at the client C1, and a deciphering operation for deciphering the file read from the filer server S. Hence, this encipher processor 3 corresponds to the encipher/decipher unit 1 shown in FIG. 1.

The secret information storage 4 stores a secret key of a user who uses the client C1, and stores the secret key K3 of the user A, for example. This secret key is input from the secret key input unit 2 shown in FIG. 1.

The communication controller 5 controls the communication of the client C1. In other words, the communication controller 5 carries out a communication between the client C1 and the file server S via the network N, and carries out a communication control process when the client C1 makes a communication with another client.

The enciphered file storage 10 of the file server S stores the enciphered files F11, F12, F21, F22, . . . , F61 and F62 in each of the directories. The directory structure unit 11 indicates the structure of the directories stored in the file server S, and is constructed as shown in FIG. 3A, for example.

Figure 3A:
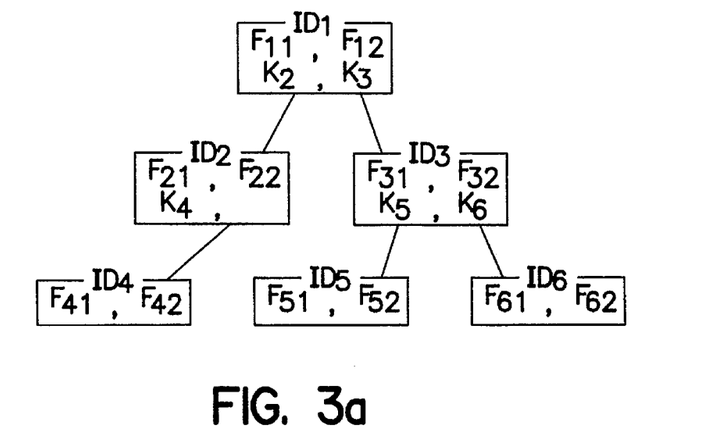
FIGS. 3A and 3B respectively are diagrams for explaining the hierarchical states of directories and cipher keys.

FIG. 3A shows data stored in the directory structure unit 11. Storage location addresses of the files F11 and F12 in the enciphered file storage 10, and the cipher keys K2 and K3 of the directories ID2 and ID3 in the layer immediately under the directory ID1 are written in the directory ID1. Storage location addresses of the files F21 and F22 in the enciphered file storage 10, and the cipher key K4 of the directory ID4 in the layer immediately under the directory ID2 are written in the directory ID2. In addition, storage location addresses of the files F31 and F32 in the enciphered file storage 10, and the cipher keys K5 and K6 of the directories ID5 and ID6 in the layer immediately under the directory ID1 are written in the directory ID3. Furthermore, storage location addresses of the files F41 and F42 in the enciphered file storage 10 are written in the directory ID4, storage location addresses of the files F51 and F52 are written in the directory ID5, and storage location addresses of the files F61 and F62 are written in the directory ID6.

Figure 3B:
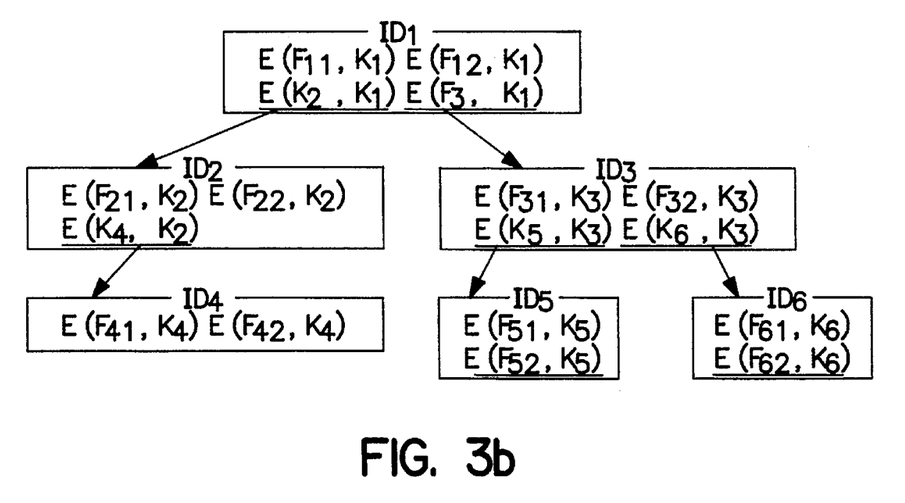

FIG. 3B is a diagram for explaining the enciphered states of the files and the cipher keys. For example, "E(F11, K1)" in the directory ID1 indicates that E is an encipherment function and the file F11 is enciphered by the cipher key K1. In addition, "E(K2, K1)" which is underlined, indicates that the cipher key K2 is enciphered by the cipher key K1. Hence, it may be seen from FIG. 3B that the files F11 and F12 (actually, the storage location addresses of these files F11 and F12) which are enciphered by the cipher key K1, and the cipher keys K2 and K6 which are enciphered by the same cipher key K1 are stored in the directory ID1.

Accordingly, the user who holds the cipher key K1 for the directory ID1 in the highest layer can not only make access to the files F11 and F12, but can make access to the files in the directory ID2 using the cipher key K2 and make access to the files in the directory ID4 using the cipher key K4, because the cipher keys K2 and K6 can be deciphered using the cipher key K1 and the cipher key K4 can be deciphered using the cipher key K2. Similarly, the user who holds the cipher key K1 for the directory ID1 can also make access to the files in the directory ID3 using the cipher key K3, and make access to the files in the directories ID5 and ID6 using the cipher keys K5 and K6, respectively, because the cipher keys K5 and K6 can be deciphered using the cipher key K3. Hence, the user who holds the cipher key K1 for the directory ID1 in the highest layer can make access to each of the files in all of the directories in the layers under the directory ID1. Therefore, it may be seen that if the user holds a cipher key for a directory in an arbitrary layer of the hierarchical directory structure, this user can make access to each file in all of the directories in the layers under this arbitrary layer by using this cipher key.

In other words, an arbitrary directory stores in addition to the enciphered files the cipher keys of the directories in the layers under the arbitrary directory, where these cipher keys are enciphered by the cipher key of the arbitrary directory. For this reason, when making access to a file of the directory in the layer under the arbitrary directory, the cipher key of the arbitrary directory is first deciphered and used as the cipher key of the directory in the lower layer. Such a procedure may be made recursively to make access to a target file in the lower layer.

For example, when the user A makes access to the file F61 of the directory ID6, the cipher key E(K6, K3) of the directory ID6 stored in the directory ID3 is deciphered using the cipher key K3 of this directory ID3, so as to obtain the cipher key K6 of the directory ID6. The following formula indicates a decipherment function D.

$$K6 = D(E(K6, K3), K3)$$

Hence, the enciphered file E(F61, K6) is deciphered using the obtained cipher key K6, so as to make access to the file F61 which is indicated by the following formula.

$$F61 = D(E(F61, K6), K6)$$

The communication controller 12 carries out a communication control process between the clients via the network N. For example, when a desired file is read from the file server S by the client C1, the communication controller 12 carries out a control process based thereon, and obtains the storage location address of the desired file from the directory structure unit 11. An access is made to the storage location address of the enciphered file storage 10 so as to read out the enciphered desired file, and the enciphered desired file is transmitted to the client C1 who requested the reading of the desired file.

Next, a description will be given of the operation of the file sharing system shown in FIG. 2 when reading a file. For example, if the user A at the client C1 reads the file F31 in the server S, the user A inputs the cipher key K3 using an integrated circuit (IC) card, for example. This cipher key K3 is stored in the secret information storage 4. If a plurality of servers exist, a plurality of server names are displayed on a display unit (not shown) of the client C1, so that the user A may select the server S.

Accordingly, the directory information is transmitted from the server S and is displayed on the display unit of the client C1, so that the user A may specify the directory ID3. By specifying this directory ID3, the files F31 and F32 which form the directory ID3 are displayed on the display unit, and the user A specifies the file F31, for example.

In this case, at the server S, the file F31 which is enciphered by the cipher key K3 is read out from the enciphered file storage 10, and the communication controller 12 transmits the read file F31 to the client C1. This file F31 is received by the communication controller 5 of the client C1. The data related to the enciphered file F31 is deciphered into the original document or the like by the encipher processor 3 based on the cipher key K3 which is stored in the secret information storage 4.

By carrying out the managing operation as described above, even the user, such as the head of an organization, who has the authority to make access to all of the directories, need only manage one cipher key of the directory in the highest layer of the hierarchical directory structure.

Figure 4:
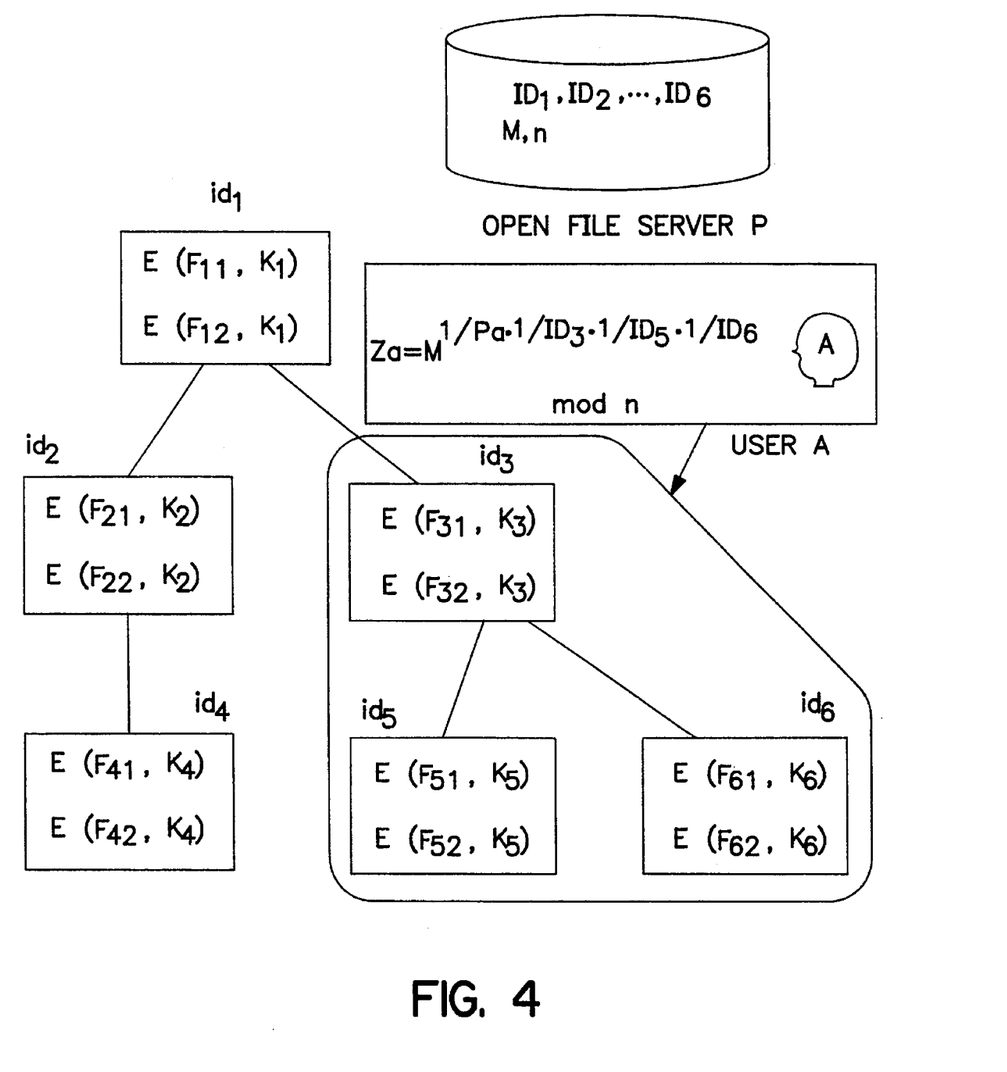
FIG. 4 is a diagram for explaining the key management states in a second embodiment of the enciphered file sharing method according to the present invention.
Figure 5:
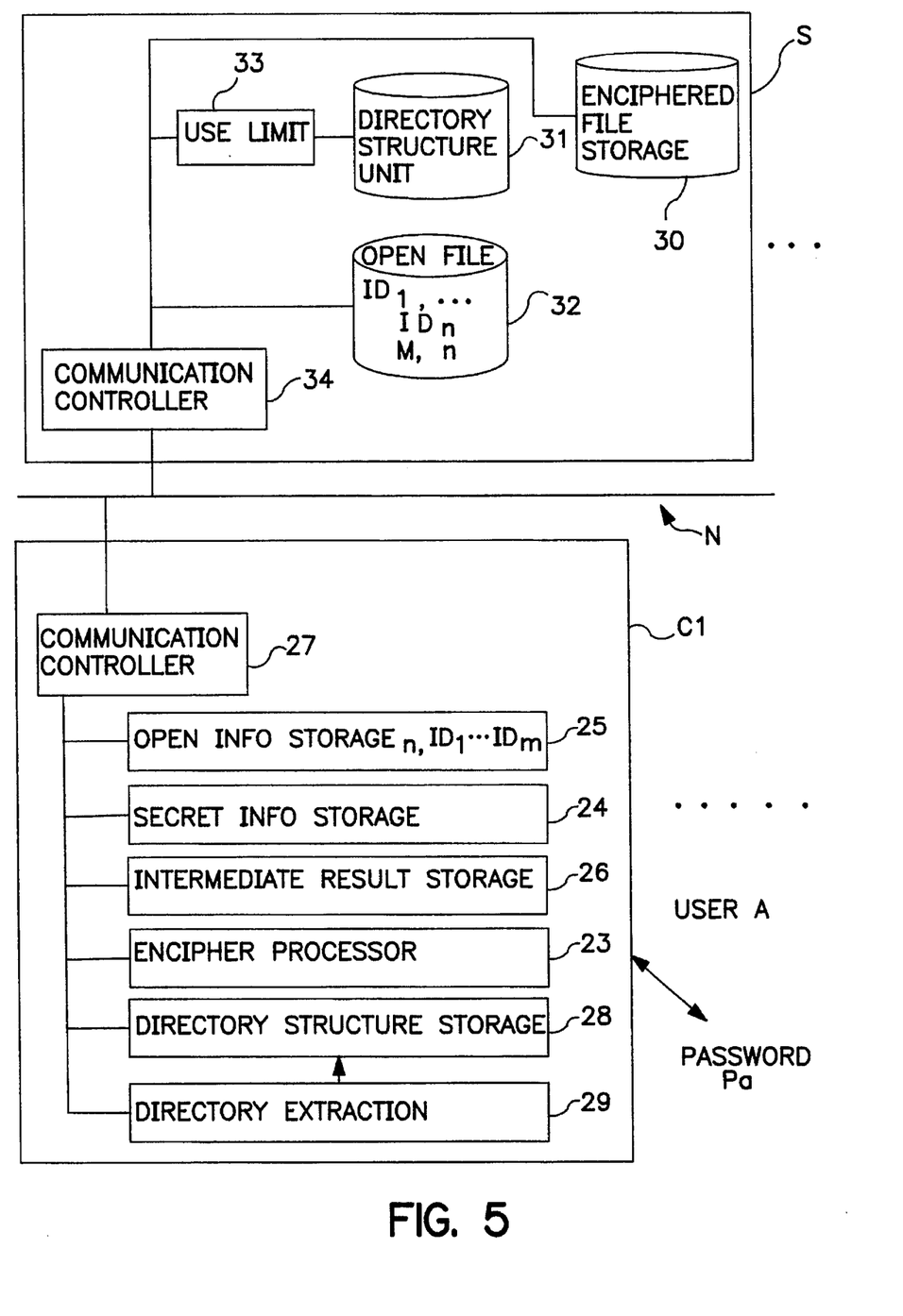
FIG. 5 is a system block diagram for explaining the second embodiment of the enciphered file sharing method.
Figure 6:
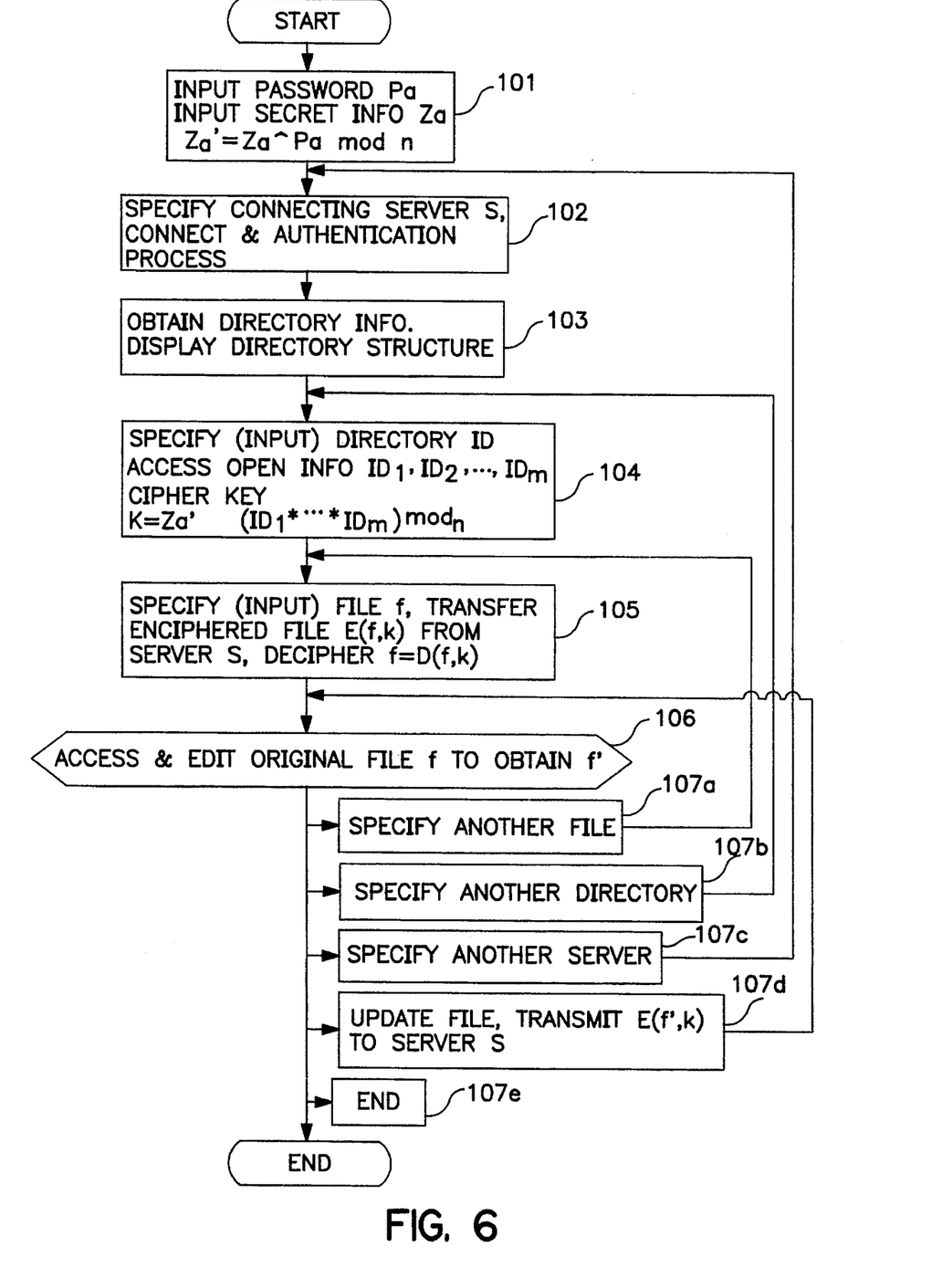
FIG. 6 is a flow chart for explaining the process of a client.
Figure 7:
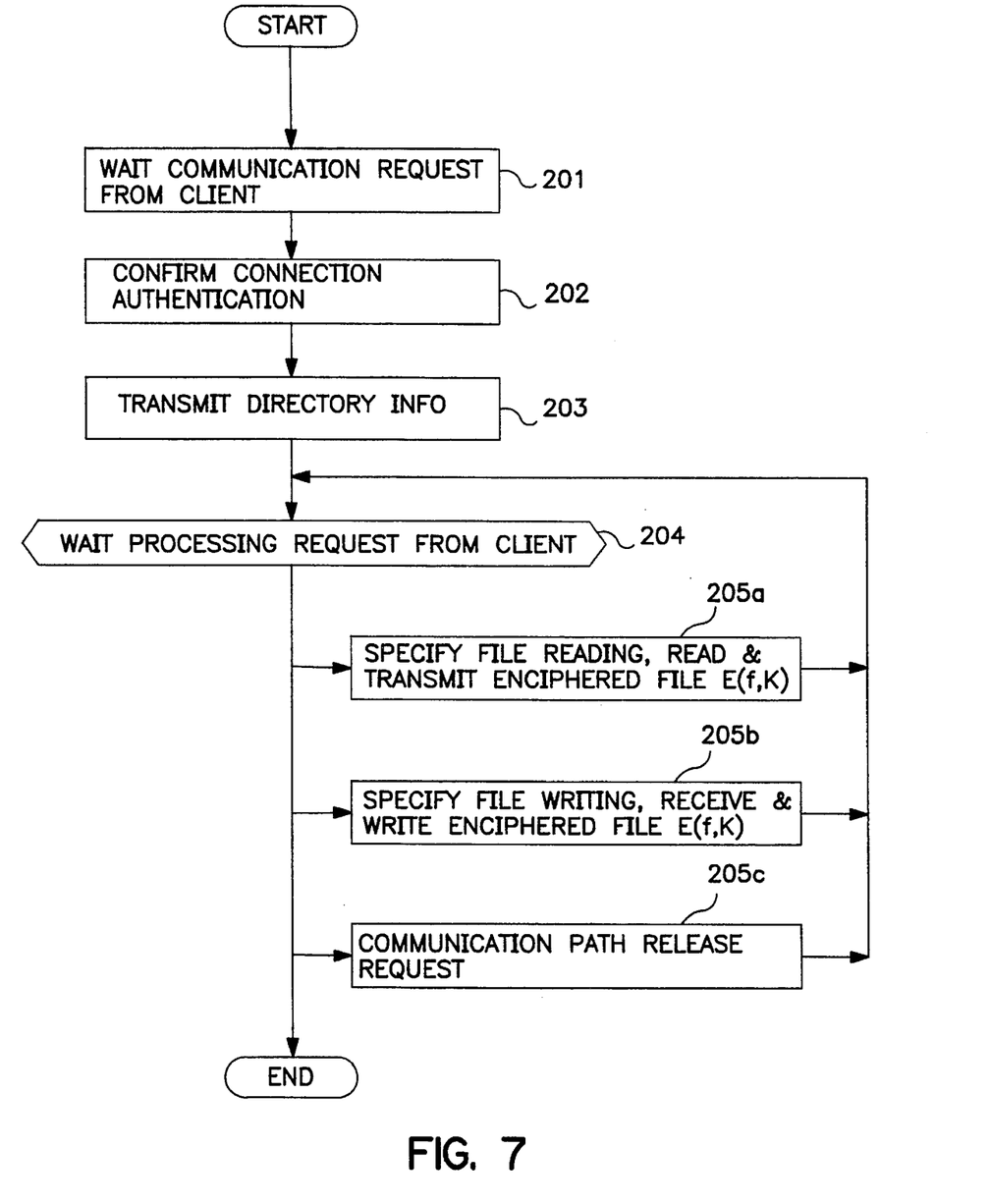
FIG. 7 is a flow chart for explaining the process of a file server.

Next, a description will be given of a second embodiment of the enciphered file sharing method according to the present invention, by referring to FIGS. 4 through 7. FIG. 4 is a diagram for explaining the key management state of the second embodiment, and FIG. 5 shows an essential part of a file sharing system to which the second embodiment may be applied. In addition, FIG. 6 is a flow chart for explaining the process of the client, and FIG. 7 is a flow chart for explaining the process of a file server.

This second embodiment employs an open key system (RAS enciphering or encoding system). In FIG. 4, it is assumed for the sake of convenience that the user A can make access to directories id3, id5 and id6, and identification information ID3, ID5 and ID6 are respectively assigned to these directories id3, id5 and id6. The identification information ID3, ID5 and ID6 are regarded as open information. Secret information Za of the user A in this case may be obtained from the following formula (1), where M and n are open information, Pa denotes a password of the user A, and a symbol "^" denotes the power such that X^Y indicates X to the power Y. The symbol "^" will be used throughout this specification.

$$Za = M^{\wedge}(1/Pa * 1/ID3 * 1/ID3 * 1/ID5 * 1/ID6) \bmod n \qquad (1)$$

In general, the file is enciphered by a cipher key Ki which is defined by the following formula (2) for an inverse element 1/IDi of the identification information of the directory to which the file belongs.

$$Kij = Zi\,(Pi*IDi1*\ldots*IDi(j-1)*IDi(j+1)*\ldots \qquad (2)$$
$$*IDim)\bmod n$$
$$= M\,(1/IDij)\bmod n$$

The user holds the secret information Zi which is calculated from the inverse element of the identification information of all directories to which the user is authorized to make an access, based on the following formula (3).

$$Zi = M\hat{\,}(1/Pi*1/IDi1*1/IDi2*\ldots*1/IDim)\bmod n \qquad (3)$$

In other words, the cipher key Ki of the file is obtained by obtaining the exponentiation of the unwanted or unnecessary identification information using the secret information Zi and the open information IDi, M and n which are distributed by the open file server P, where n is a product (n=p*q) of prime numbers p and q.

When the user A makes access to the file F31 of the directory id3, the open information n, ID5 and ID6 is distributed from the open file server P. Using the password Pa held by the user A and the secret information Za, the cipher key K3 is calculated from the following formula (4) by obtaining the exponentiation of Pa, ID5 and ID6, and the file F31 is deciphered using the cipher key K3.

$$K3 = Za\,(Pa*ID5*ID6)\bmod n \qquad (4)$$
$$= M\,(1/ID3)\bmod n$$

When the user A makes an access to the file of the directory id5, the cipher key K5 of the directory id5 is obtained similarly by obtaining the exponentiation of Pa, ID3 and ID6. It is extremely difficult to calculate 1/IDi from IDi without knowing the prime numbers p and q which make n=p*q, and the safety of the system will be unaffected even if IDi is distributed and made open. Accordingly, it is possible to manage a plurality of cipher keys by a single secret information.

In FIG. 4, the identification information ID of each directory and the open information n and M are given by the following.

ID1=71, ID2=73, ID3=79,

ID4=83, ID5=89, ID6=97 n=p*q=31*29=899

M=20

In this case, the secret information Za of the user A who has the authority to make access to the directories id3, id5 and id6, and the secret information Zb of the user B who has the authority to make access to only the directory id6, may be obtained as follows which results in Za=257 and Zb=545. In this case, however, it is assumed that the passwords Pa and Pb of the users A and B respectively are Pa=173 and Pb=229.

$$
\begin{aligned}
Za &= M\,(1/Pa*1/ID3*1/ID5*1/ID6)\bmod n \\
&= 20\,(173*319*269*13)\bmod n \\
&= 257 \\
Zb &= M\,(1/Pb*1/ID6)\bmod n \\
&= 20\,(229*13)\bmod n \\
&= 545
\end{aligned}
$$

In general, the identification information ID1, ..., IDm of each of the files and the product n=p*q of certain prime numbers p and q are made open, and the secret information Zi of the user i is defined by a least common denominator L of (p−1) and (q−1), an integer p*q>M, the password Pi of the user i, the identification information IDi1, IDi2, ..., IDim of all of the files to which the user i is authorized to make access, and inverse elements 1/IDi1, 1/IDi2, ..., 1/IDim having L as the modulus based on the following formula (5) and distributed.

$$Zi = M\hat{\,}(1/Pi*1/IDi1*1/IDi2*\ldots*1/IDim)\bmod n \qquad (5)$$

In addition, when enciphering and deciphering the file IDij, the cipher key Kij is calculated from the following formula (6) based on the password Pi of the user i and the identification information of all files other than IDij, and the management of the enciphering and deciphering is made using the cipher key Kij.

$$Kij = Zi\,(Pi*IDi1*\ldots*IDi(j-1)*IDi(j+1)*\ldots \qquad (6)$$
$$*IDim)\bmod n$$
$$= M\,(1/IDij)\bmod n$$

The second embodiment may be applied to the file sharing system shown in FIG. 5. In FIG. 5, a plurality of clients typified by the client C1, and a plurality of file servers typified by the file server S are coupled to the network N.

As indicated for the client C1, each client is provided with an encipher processor 23, a secret information storage 24, an open information storage 25, an intermediate result storage 26, a communication controller 27, a directory structure storage 28, and a directory extraction unit 29. On the other hand, as indicated for the file server S, each file server is provided with an enciphered file storage 30, a directory structure unit 31, an open file storage 32, a use limiting unit 33, and a communication controller 34.

The encipher processor 23 carries out processes such as deciphering the cipher key from the secret information, deciphering the enciphered file using the cipher key, and enciphering the original document or the like for storage in the file.

The secret information storage 24 stores the secret information Zi of the user i, and the password Pi of the user i.

The open information storage 25 stores the identification information ID1, ID2, ..., IDm of the directories id1, id2, ..., idm, the open information M and n and the like which are distributed by the file server S.

The intermediate result storage 26 holds intermediate results of the calculation which is required to obtain the cipher key, so that the user may refer to the intermediate results again if appropriate so as to speed up the calculation process. For example, when first calculating the cipher key K3 from the following formulas in order to make access to the directory id3, for example, intermediate results K3' and K3" of this calculation are temporarily stored in the intermediate result storage 26.

$$
\begin{aligned}
K3' &= Za\,Pa & \bmod n &= M\hat{\,}(1/ID3*1/ID5*1/ID6)\bmod n \\
K3'' &= K3'\,ID5 & \bmod n &= M\hat{\,}(1/ID3*1/ID6)\bmod n \\
K3 &= K3''\,ID6 & \bmod n &= M\,(1/ID3)\bmod n
\end{aligned}
$$

By using the above intermediate results K3' and K3", it is possible to calculate the cipher key K6 of the directory id6 at a high speed by carrying out the following calculation.

$$K6 = K3''\hat{\,}ID3 \bmod n = M\hat{\,}(1/ID3)\bmod n$$

The communication controller 27 carries out processes such as making a communication between the client C1 and the file server S via the network N, and carrying out a communication control process when the client C1 communicates with another client.

The directory structure storage 28 stores directory structure information transmitted from the file server S. A mark which indicates a directory range which is usable by the user who uses the client C1 is added to the directory structure information. For example, in the case shown in FIG. 4, the added mark indicates that the directory range usable by the user A includes the directories id3, id5 and id6.

The directory extraction unit 29 extracts which open information is necessary to calculate the cipher key, and extracts the identification information other than the selected directory if a plurality of usable directory exist. If the user A selects the directory id3 in FIG. 4, the directory extraction unit 29 extracts the identification information ID5 and ID6 from the open information storage 25. On the other hand, if the user A selects the directory id5, the directory extraction unit 29 extracts the identification information ID3 and ID6 from the open information storage 25.

The enciphered file storage 30 stores the enciphered files F11, F12, . . . , F61, F62 of each of the directories.

The directory structure unit 31 indicates the structure of the directories stored in the file server S, and has the construction shown in FIG. 4 in this embodiment. In other words, the directory structure unit 31 is written with the storage location addresses of each of the enciphered files in the enciphered file storage 30.

The open file storage 32 stores the identification information ID1 through ID6 of the directories id1 through id6, the open information M and n and the like. These information are distributed from the open file storage 32 when the file server S is connected to the client C1.

The use limiting unit 33 adds a mark so that the usable range of the user of the client C1 can be distinguished when transmitting the directory structure from the directory structure unit 31 to the client. C1.

The communication controller 34 carries out a communication control process between the file server S and the client C1 via the network N. In other words, the communication controller 34 carries out processes such as outputting the open information M and n and the identification information ID1 through IDm from the open file storage 32 at the request of the client C1, transmitting the directory information from the directory structure unit 31, and making access to a desired file in the enciphered file storage 30.

Next, a description will be given of this second embodiment of the enciphered file sharing method according to the present invention, by referring to FIGS. 6 and 7.

First, a description will be given of the process carried out on the client side for a case where the user A uses the client C1, by referring to the flow chart of FIG. 6.

In FIG. 6, a step 101 carries out an authentication process after starting the client C1. The user A inputs the password Pa and the secret information Za. For example, this input may be made using an IC card, a magnetic card or the like which is read by a card reader. By making this input, the encipher processor 23 shown in FIG. 5 computes Za' (above described K3') of the following formula (7), and stores the computed Za' in the intermediate result storage 26.

$$Za'=Za^{Pa} \bmod n \quad (7)$$

Then, in a step 102, the user A specifies the file server S to which the client C1 is to connect by making a selection from a plurality of file servers displayed on the display unit of the client C1. The file server S may be specified using a mouse, for example. Hence, the communication controller 27 makes a connection to the specified file server S, and carries out an authentication process by transmitting the password Pa which indicates the user A. The client C1 and the file server S-are connected in this manner, and the file server S recognizes that the user A is the user at the client C1.

The identification information ID1 through ID6, the open information M and n and the like are transmitted from the file server S, and these information are stored in the open information storage 25.

When the file server S and the client C1 are connected, the communication controller 33 of the file server S reads the directory information from the directory structure unit 31 and transmits the directory information to the client C1. At the client C1, a step 103 receives the directory information by the communication controller 27 and stores the directory information in the directory structure storage 28. In addition, the step 103 displays the directory structure of the file server S on the display unit based on a client program. For example, the directories id1 through id6 shown in FIG. 4 are displayed on the display unit. In this state, the mark is added to indicate that the usable range of the directories to which the user A is authorized to make an access includes the directories id3, id5 and id6, and this usable range of the directories is also displayed on the display unit.

In a step 104, the user A monitors the directory structure displayed on the display unit of the client C1, and specifies the required directory id3 using a mouse, for example. As a result, the directory extraction unit 29 recognizes that the directories id5 and id6 are the directories other than the directory id3 and are within the usable range of the directories to which the user A is authorized to make an access. Hence, the directory extraction unit 29 extracts the identification information ID5 and ID6 of the directories id5 and id6 from the open information storage 25, and computes the cipher key K3 in the encipher processor 23.

In this state, Za' of the formula (7) described above and stored in the intermediate result storage 26 is read out, and is used to compute K3" based on the following formula (8) using the identification information ID5. The computed K3" is stored in the intermediate result storage 26.

$$K3''=K3'^{ID5} \bmod n \quad (8)$$

Then, the above K3" of the formula (8) described above and stored in the intermediate result storage 26 is read out, and is used to compute the cipher key K3 based on the following formula (9) using the identification information ID6. At the same time, the client C1 obtains all of the files existing in the directory id3 from the file server S via the network N, that is, a list of the files F31 and F32, and displays the same on the display unit.

$$K3=K3''^{ID6} \bmod n \quad (9)$$

Next, in a step 105, the user A specifies the required one of the files F31 and F32 in the directory id3. In this particular case, the user A specifies the file F31 displayed on the display unit by use of a mouse, for example. As a result, the communication controller 27 requests the transmission of the file F31 with respect to the file server S. In response to this request, the file server S reads out the enciphered file F31 from the enciphered file storage 30 and transmits the enciphered file F31 to the client C1. The enciphered file F31 is received by the client C1, and is deciphered in the encipher processor 23 using the cipher key K3, so as to obtain the original document or the like of the file F31 (that is, a deciphered file f).

Then, at the client C1, a step 106 carries out a data processing by referring to the deciphered file f or an editing to form an edited file f' from the deciphered file f. Thereafter, one of steps 107a through 107e is carried out.

The step 107a specifies another file within the same directory, and the process returns to the step 105. The step 107b reads another file by specifying another directory, and the process returns to the step 104. The step 107c specifies another file server, and the process returns to the step 102. The step 107d updates the file, enciphers the updated file using the cipher key K3, transmits the enciphered updated file to the file server S, and the process returns to the step 106. The step 107e ends the process.

Next, a description will be given of the process carried out on the file server side, by referring to the flow chart of FIG. 7.

In FIG. 7, a step 201 waits for a communication request from a client when the file server S is operated.

A connection is made between the client C1 and the file server S when the file server S is specified by the step 102 shown in FIG. 6, and the authentication is confirmed by recognizing the user A based on the password Pa which is input. Then, the communication controller 34 transmits the identification information ID1 through ID6 and the open information M and n to the client C1 from the open file storage 32.

Accordingly, at the file server S, a step 203 reads the file structure shown in FIG. 4 from the directory structure unit 31. Since it is recognized that the user is the user A, the use limiting unit 33 adds a mark which indicates the access authorization to the range of the directories including the directories id3, id5 and id6, to indicate the range of directories to which the user A is authorized to make an access. Hence, the range of the directories added with the mark is transmitted to the client C1 via the communication controller 34.

Thereafter, in a step 204, the file server S waits for a processing request from the client C1, and one of steps 205a through 205c is carried out.

The step 205a reads the specified enciphered file when the reading of the file is specified, and the read enciphered file is transmitted. The step 205b receives the enciphered file when the writing of the file is specified, and the received enciphered file is written into a specified location. The step 205c releases the communication path when a communication path release request is made, and the connection between the file server S and the client C1 is disconnected. The process returns to the step 204 after each of the steps 205a through 205c.

When the user A makes an access to the file F61 of the directory id6, the directory id6 is selected by a mouse by specifying the directory id6 in the directory structure which is displayed on the display unit based on the client program. Hence, the directory extraction unit 29 recognizes ID3, ID5 and n as the information necessary for calculating the cipher key K6, and these information (data) are read out from the open file storage 25. The cipher key K6 is calculated by the encipher processor 23 based on the following formula (10). In this case, K6=103 if ID3=79, ID5=89, M=29 and n=899.

$$Ka = \hat{Za}(Pa*ID3*ID5) \bmod n$$
$$= M(1/ID3) \bmod n$$
$$= 103$$

(10)

At the same time, the client C1 obtains all files existing in the directory id6, that is, a list of the files F61 and F62, from the file server S via the network N.

The user A then specifies the file F61 by a mouse. As a result, the client C1 obtains an enciphered file E(F61, K6) from the file server S. This enciphered file E(F61, K6) is supplied to the encipher processor 23 and deciphered using the previously calculated cipher key K6, so as to obtain the original document or the like of the file F61. This original document of the like of the file F61, that is, the deciphered file, is supplied to the user A.

When modifying or adding files, the procedures carried out are in reverse to the procedures described above. In other words, a new file is enciphered using the cipher key K6 and transmitted to the file server S. The file server S does not carry out the enciphering or deciphering.

The above described file F61 is shared between the users A and B. Hence, the user B is guaranteed that the user B can similarly obtain this file F61. In order for the user B to calculate the cipher key K6, the exponentiation of the password Pb and the secret information Zb of the user B is simply obtained. Therefore, the cipher key K6 can be obtained from the following formula (11).

$$K6 = \hat{Zb}(Pb) \bmod n$$
$$= M(1/Pb*Pb*1/ID6) \bmod n$$
$$= 103$$

(11)

Therefore, by simply managing the secret information Za and Zb at the respective users A and B, it is possible to share the cipher key K6 and commonly make access to an arbitrary file within the directory which is accessible by use of the cipher key K6.

Further, the present invention is not limited to these embodiments, but various variations and modifications may be made without departing from the scope of the present invention.

What is claimed is:

1. An enciphered file sharing method adapted to an area distributed type data processing system in which a plurality of data processing units are coupled via a network and a plurality of users share files while maintaining privacy among the users, said enciphered file sharing method comprising the steps of:

(a) assigning a cipher key to each of a plurality of directories storing enciphered files by a first data processing unit which functions as a file server;

(b) determining, by said first data processing unit, a set of said plurality of directories that are accessible by the users of each of the data processing units; and (c) determining, by said first data processing unit, one specific directory out of said set of directories accessible by the users of each of the data processing units, and enciphering said cipher keys of the set of accessible directories other than the specific directory using said cipher key assigned to the specific directory to store the cipher keys of the set of accessible directories other than the specific directory in the specific directory;

(d) distributing, by said first data processing unit, the cipher key assigned to the specific directory to the user of a second data processing unit via a communication path; and (e) enciphering and deciphering the files of the specific directory using the cipher key of the specific directory to access the specific directory of said first data processing unit, and deciphering the cipher keys of the set of accessible directories enciphered by the cipher key of the specific directory and stored in the specific directory to access the set of accessible directories other than the specific directory using said cipher key assigned to the specific directory when the user of said second data processing unit accesses the files of said first data processing unit.

2. The enciphered file sharing method as claimed in claim 1, which further comprises the step of:

(f) automatically calculating a cipher key of said specific directory by specifying the specific directory in a file access support interface.

3. The enciphered file sharing method as claimed in claim 2, which further comprises the step of:

(g) automatically deciphering a specific file of the specific directory by specifying the specific file in the file access support interface.

4. The enciphered file sharing method as claimed in claim 1, which further comprises the step of:

(f) automatically deciphering a specific file of the specific directory by specifying the specific file in the file access support interface.

5. The enciphered file sharing method as claimed in claim 1, wherein the directories have a hierarchical tree structure.

6. An enciphered file sharing method adapted to an area distributed type data processing system in which a plurality of data processing units are coupled via a network and a plurality of users share files while maintaining privacy among the users, said enciphered file sharing method comprising the steps of:

(a) assigning identification information ID1, ID2, . . . , IDm to each of m directories storing files in a first data processing unit which functions as a file server, said identification information ID1, ID2, . . . , IDm being stored in an open file accessible from all of the data processing units together with a product n=p*q of prime numbers p and q, a cipher key Ks of a file of a directory having an identification information IDs being described by Ks=M^(1/IDs) mod n, where s=1, 2, . . . , m, M is an integer satisfying M<n, L denotes a least common denominator of (p−1) and (q−1), 1/IDs denotes an inverse element having L as a modulus of IDs, and a symbol "^" denotes a power such that X^Y indicates X to the power Y;

(b) determining, by the first data processing unit k, directories which are accessible by a user i of a second data processing unit and respectively have identification information IDi1, IDi2, . . . , IDik;

(c) transferring a secret password Pi to a communication path from the second data processing unit of the user i;

(d) generating in the first data processing unit secret information Zi for making a key for accessing a directory, and issuing the secret information Zi to the user i, said secret information Zi being described by Zi=M^(1/Pi*1/IDi1*1/IDi2* . . . *1/IDim) mod n, where 1/IDi1, 1/IDi2, . . . , 1/IDim denote inverse elements having L as a modulus of IDi1, IDi2, . . . , IDim; and (e) obtaining a key Kij for making access to a file having an identification information IDij from the second data processing unit of the user i by calculating Kij= Zi^(Pi*IDi1*IDi2* . . . *IDi(j−1)*IDi(j+1)* . . . *IDm) mod n based on the secret information Zi, the secret password Pi and all of the identification information retrieved from the open file excluding the identification information IDij.

7. The enciphered file sharing method as claimed in claim 6, wherein said step (e) successively obtains an exponentiation of the identification information when calculating the key Kij and temporarily stores each result of the exponentiation for use when calculating a key of another directory.

8. An enciphered file sharing method adapted to an area distributed type data processing system in which a plurality of data processing units are coupled via a network and a plurality of users share files while maintaining privacy among the users, said enciphered file sharing method comprising the steps of:

(a) enciphering files using a cipher key and storing enciphered files in directories having a hierarchical tree structure by a first data processing unit which functions as a file server;

(b) enciphering files having the same access attribute by the same cipher key by assigning one cipher key to each of the directories;

(c) transferring the enciphered files in the network and locally deciphering the enciphered files in at least a second data processing unit which is used by one of the users, said second data processing unit being different from said first data processing unit;

(d) enciphering files in at least said second data processing unit to transfer the enciphered files in the network; and (e) authorizing access of an arbitrary user having authority to make access to an arbitrary directory to all directories in layers of the hierarchical tree structure lower than one of said layers to which the arbitrary directory belongs, the arbitrary directory being accessible by all users having authority to access a directory in a layer of the hierarchical tree structure higher than the one layer, and said step (a) further storing in the arbitrary directory the cipher keys of all directories in a layer immediately under the one layer by enciphering the cipher keys by the cipher key of the arbitrary directory, so that all directories in the layers lower than the one layer of the hierarchical tree structure are accessible by the cipher key of the arbitrary directory.

9. The enciphered file sharing method as claimed in claim 8, which further comprises the step of:

(f) automatically calculating a cipher key of a specific directory by specifying the specific directory in a file access support interface.

10. The enciphered file sharing method as claimed in claim 9, which further comprises the step of:

(g) automatically deciphering a specific file of the specific directory by specifying the specific file in the file access support interface.

11. An enciphered file sharing method adapted to an area distributed type data processing system in which a plurality of data processing units are coupled via a network and a plurality of users share files while maintaining privacy among the users, said enciphered file sharing method comprising the steps of:

(a) enciphering files using a cipher key and storing enciphered files in directories having a hierarchical tree structure, by a first data processing unit which functions as a file server;

(b) enciphering files having the same access attribute by the same cipher key by assigning one cipher key to each of the directories;

(c) transferring the enciphered files in the network and locally deciphering the enciphered files in at least a second data processing unit which is used by one of the users, said second data processing unit being different from said first data processing unit;

(d) authorizing access of an arbitrary user having authority to make access to an arbitrary directory to all directories in layers of the hierarchical tree structure lower than one of said layers to which the arbitrary directory belongs, the arbitrary directory being accessible by all users having authority to access a directory in a layer of the hierarchical tree structure higher than the one layer, and said step (a) further storing in the arbitrary directory the cipher keys of all directories in a layer immediately under the one layer by enciphering the cipher keys by the cipher key of the arbitrary directory, so that all directories in the layers lower than the one layer of the hierarchical tree structure are accessible by the cipher key of the arbitrary directory;

(e) making open identification information $ID_1, \ldots, ID_m$ of each of the directories, where m is an integer, and a product $n=p*q$ of prime numbers p and q;

(f) distributing secret information $Z_i$ of a user i defined by a formula $$Z_i = M^{\wedge}(1/P_i * 1/ID_{i1} * 1/ID_{i2} * \ldots * 1/ID_{im}) \bmod n$$

where L denotes a least common denominator of $(p-1)$ and $(q-1)$, M denotes an integer satisfying $p*q>M$, $P_i$ denotes a password $P_i$ of the user i, $ID_{i1}, ID_{i2}, \ldots, ID_{im}$ denote identification information of all of the directories to which the user i is authorized to make an access, $1/ID_{i1}, 1/ID_{i2}, \ldots, 1/ID_{im}$ denote inverse elements having L as a modulus, and a symbol "^" denotes a power such that $X^{\wedge}Y$ indicates X to the power Y; and (g) calculating a cipher key $K_{ij}$ of a directory $id_{ij}$ form a formula $$K_{ij} = Z^{\wedge}(P_i * ID_{i1} * \ldots * ID_{i(j-1)} * ID_{i(j+1)} * \ldots * ID_{im}) \bmod n$$

based on the password $P_i$ of the user i and the identification information of all files other than identification information $ID_{ij}$ of the directory $id_{ij}$ when enciphering and deciphering the directory $id_{ij}$.

12. The enciphered file sharing method as claimed in claim 11, wherein said step (g) successively obtains an exponentiation of the identification information when calculating the cipher key and temporarily stores each result of the exponentiation for use when calculating a cipher key of another directory.

* * * * *

UNITED STATES PATENT AND TRADEMARK OFFICE
CERTIFICATE OF CORRECTION

PATENT NO. : 5,584,022
DATED : December 10, 1996
INVENTOR(S) : Hiroaki KIKUCHI et al.

It is certified that error appears in the above-indentified patent and that said Letters Patent is hereby corrected as shown below:

Column 5

Line 17, change "E(K2, K1)" to --E(K2, K1)--.

Column 6

Line 62, equation (1), change "(1/Pa*1/ID3*1/ID3*1/ID5*1/ID6)"
to --(1/Pa*1/ID3*1/ID5*1/ID6)--.

Column 9

Line 66, change "S-are" to --S are--.

Signed and Sealed this

First Day of April, 1997

BRUCE LEHMAN

Attest:

Attesting Officer

Commissioner of Patents and Trademarks